United States Patent
Lavole (10) Patent No.: US 10,062,155 B2
(45) Date of Patent: Aug. 28, 2018

(54) APPARATUS AND METHOD FOR DETECTING DEFECT OF IMAGE HAVING PERIODIC PATTERN

(71) Applicant: LG Display Co., Ltd., Seoul (KR)

(72) Inventor: Philippe Lavole, Paju-si (KR)

(73) Assignee: LG DISPLAY CO., LTD., Seoul (KR)

(*) Notice: Subject to any disclaimer, the term of this patent is extended or adjusted under 35 U.S.C. 154(b) by 753 days.

(21) Appl. No.: 14/083,976

(22) Filed: Nov. 19, 2013

(65) Prior Publication Data
US 2015/0139530 A1    May 21, 2015

(51) Int. Cl.
G06K 9/00 (2006.01)
G06T 7/00 (2017.01)
G06T 7/70 (2017.01)

(52) U.S. Cl.
CPC .............. G06T 7/0004 (2013.01); G06T 7/70 (2017.01)

(58) Field of Classification Search
None
See application file for complete search history.

(56) References Cited

U.S. PATENT DOCUMENTS

| | | | | |
|---|---|---|---|---|
| 6,888,958 B1* | 5/2005 | Sawa | ................... | G06T 7/0026 382/144 |
| 8,126,259 B2* | 2/2012 | Shimura | ....................... | 382/149 |
| 2002/0031249 A1 | 3/2002 | Komuro et al. | | |
| 2003/0057384 A1 | 3/2003 | Fukazawa | | |
| 2007/0025611 A1* | 2/2007 | Kanda | ................. | G01N 21/4788 382/149 |
| 2007/0031025 A1* | 2/2007 | Lim | ......................... | G06T 7/001 382/149 |
| 2008/0181484 A1* | 7/2008 | Litichever | ................ | G06T 7/001 382/145 |
| 2009/0129682 A1 | 5/2009 | Ersue et al. | | |
| 2011/0075937 A1* | 3/2011 | Tate | .............................. | 382/218 |
| 2012/0070067 A1* | 3/2012 | Fang et al. | ..................... | 382/151 |
| 2013/0051611 A1* | 2/2013 | Hicks | ...................... | G06T 7/001 382/103 |

(Continued)

FOREIGN PATENT DOCUMENTS

| | | |
|---|---|---|
| CN | 1365445 A | 8/2002 |
| CN | 101405766 A | 4/2009 |
| JP | 2001041720 A | 2/2001 |

OTHER PUBLICATIONS

Sauvola, Jaakko, and Matti Pietikäinen. "Skew angle detection using texture direction analysis." image 100.1 (1995): T1.*

*Primary Examiner* — Sumati Lefkowitz
*Assistant Examiner* — David Perlman
(74) *Attorney, Agent, or Firm* — Dentons US LLP (57) ABSTRACT

Disclosed is a defect detection apparatus. The defect detection apparatus includes an angle extractor configured to extract a slope angle of a pattern from an original image in which a plurality of the patterns are formed at periodic intervals, a pattern period extractor configured to extract a pattern period at which the patterns are separated from each other, by using the slope angle, and an image shifter configured to shift the original image by the pattern period in a direction perpendicular to the slope angle to form the shifted image. The present invention shifts an image by using the slope angle and pattern period of the periodic pattern, thus easily extracting a defect of the original image.

5 Claims, 7 Drawing Sheets

(56) References Cited

U.S. PATENT DOCUMENTS

2013/0083965 A1* 4/2013 Joung ............... G06K 9/4671
382/103
2014/0210982 A1* 7/2014 Zuo ..................... G06T 7/001
348/80

* cited by examiner

FIG. 1

Related Art

FIG. 2

Related Art

Pattern period

APPARATUS AND METHOD FOR DETECTING DEFECT OF IMAGE HAVING PERIODIC PATTERN

CROSS-REFERENCE TO RELATED APPLICATIONS

This application claims the benefit of the Korean Patent Application No. 10-2012-0135612 filed on Nov. 27, 2012, which is hereby incorporated by reference for all purposes as if fully set forth herein.

BACKGROUND OF THE INVENTION

Field of the Invention

The present invention relates to a defect detection apparatus and method. More particularly, the present invention relates to an apparatus and method for detecting a defect of an image having a periodic pattern.

Discussion of the Related Art

Figure 1:
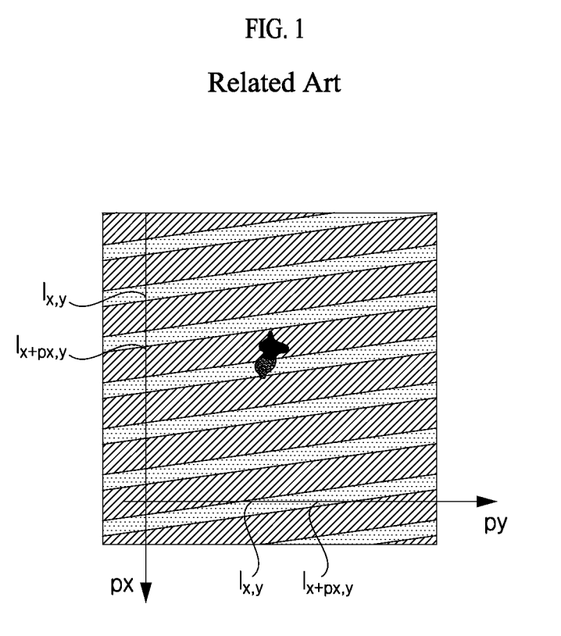
FIGS. 1 and 2 are diagrams showing a related art method of detecting a defect of an image having a periodic pattern.
Figure 2:
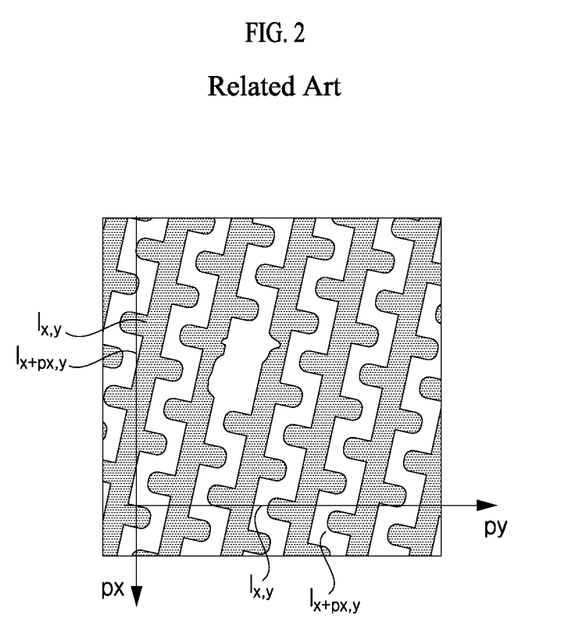

FIGS. 1 and 2 are diagrams showing a related art method of detecting a defect of an image having a periodic pattern.

As illustrated in FIG. 1, the related art method shifts an image for detecting a defect, measures an error of an image before and after the shift, and extracts a pattern period by using a shifting value of when the error is minimized.

For example, when px denotes a value shifted in a perpendicular direction and py denotes a value shifted in a horizontal direction, the related art method progressively increases px and py and shifts an image through repetition for extracting a repetition period of a pattern, analyzes image errors before and after the shift to calculate an image having the minimum error. That is, px and py of when an error between images is the minimum are extracted as a pattern period.

However, in the related art, since an image should be repeatedly shifted until the minimum error is measured for extracting a pattern period, a considerable calculation time is expended.

Moreover, when the related art method of detecting a defect of an image having a periodic pattern is applied to an image having a complicated shaped pattern as illustrated in FIG. 2, it is inaccurate to measure an error of an image having such a complicated pattern. For this reason, it is difficult to extract a sufficiently accurate pattern period.

SUMMARY OF THE INVENTION

Accordingly, the present invention is directed to an apparatus and method for detecting a defect of an image having a periodic pattern that substantially obviate one or more problems due to limitations and disadvantages of the related art.

An advantage of the present invention is to provide a defect detection apparatus and method for quickly extracting a pattern period from an image having a periodic pattern.

Another aspect of the present invention is to provide a defect detection apparatus and method that extracts a slope angle with a pattern formed therein, and shifts an image by using the slope angle, thus enhancing an arithmetic operation speed.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a defect detection apparatus including: an angle extractor configured to extract a slope angle of a pattern from an original image in which a plurality of the patterns are formed at periodic intervals; a pattern period extractor configured to extract a pattern period at which the patterns are separated from each other, by using the slope angle; and an image shifter configured to shift the original image by the pattern period in a direction perpendicular to the slope angle to form the shifted image.

In another aspect of the present invention, there is provided a defect detection method including: extracting a slope angle of a pattern from an original image in which a plurality of the patterns are formed at periodic intervals; extracting a pattern period at which the patterns are separated from each other, by using the slope angle; and shifting the original image by the pattern period in a direction perpendicular to the slope angle to form the shifted image.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE ILLUSTRATED EMBODIMENTS

Reference will now be made in detail to the exemplary embodiments of the present invention, examples of which are illustrated in the accompanying drawings. Wherever possible, the same reference numbers will be used throughout the drawings to refer to the same or like parts.

A defect detection apparatus according to the present invention deletes a periodically formed pattern for detecting an amorphous defect of the periodically formed pattern, and extracts only an irregular defect.

When an image having a periodic pattern moves by a pattern period to delete an overlapping area, only an aperiodic defect remains, but the defect detection apparatus according to the present invention detects a defect by using the principle.

Hereinafter, the defect detection apparatus according to the present invention extracting a slope angle of a periodic pattern from the original pattern, extracting a pattern period, shifting an image, and detecting a defect will be described in detail with reference to the accompanying drawings.

Figure 3:
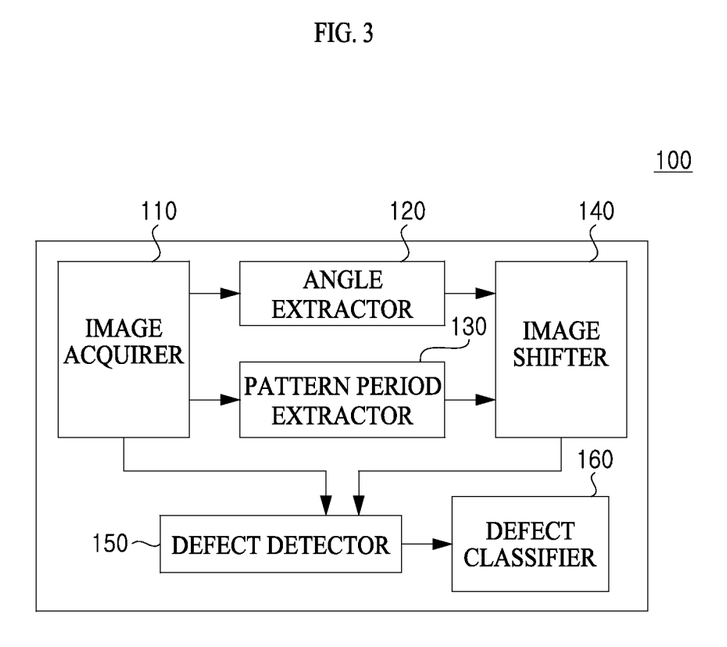
FIG. 3 is a block diagram illustrating an embodiment of a defect detection apparatus according to the present invention.

FIG. 3 is a block diagram illustrating an embodiment of a defect detection apparatus 100 according to the present invention.

As seen in FIG. 3, a defect detection apparatus 100 according to the present invention includes an angle extractor 120, a pattern period extractor 130, and an image shifter 140. Also, the defect detection apparatus 100 may further include an image acquirer 110, a defect detector 150, and a defect classifier 160 depending on the case.

The image acquirer 110 acquires an original image in which patterns are formed at periodic intervals. In an embodiment, the image acquirer 110 may include an image acquisition sensor such as a CCD image sensor. Hereinafter, an embodiment of an image having a periodic pattern acquired from the image acquirer 110 will be described with reference to FIG. 4.

Figure 4:
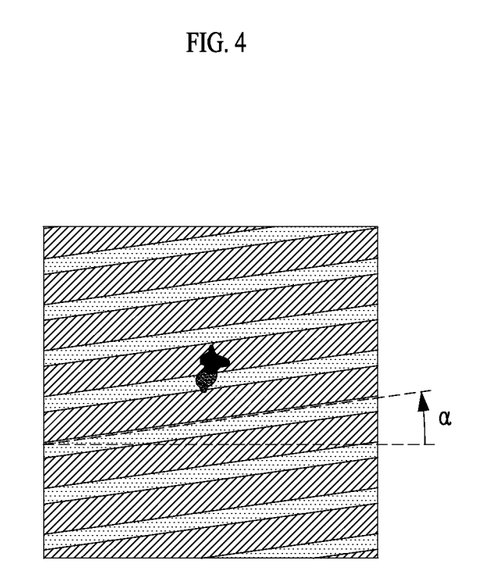
FIG. 4 is an image showing that a pattern having a certain slope angle is periodically formed in the original image obtained from the defect detection apparatus according to the present invention.

FIG. 4 is an image showing a pattern having a certain slope angle that is periodically formed in the original image obtained from the defect detection apparatus according to the present invention.

As seen in FIG. 4, the image acquirer 110 acquires a picture of the original image in which patterns are formed at periodic intervals. Here, the pattern formed in the original image may be inclined at a certain slope angle.

In an embodiment, the original image may be a circuit pattern of a display device in which an electrical signal flows or a semiconductor circuit pattern in which an electrical signal flows, but may also be an image including a periodically repeated pattern without being limited thereto.

Moreover, the original image includes a periodically formed pattern and an irregularly shaped defect which is formed in a line forming a periodic pattern. The defect includes various defects such as a short circuit and a disconnection between a circuit pattern.

Referring again to FIG. 3, the angle extractor 120 extracts a slope angle of a pattern from the original image having the patterns formed at periodic intervals.

This will be described in more detail with reference to FIGS. 5 to 7.

Figure 5:
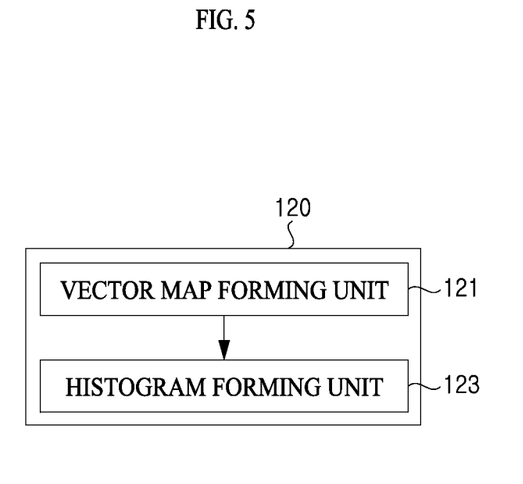
FIG. 5 is a block diagram illustrating an angle extractor in an embodiment of the defect detection apparatus according to the present invention.
Figure 6:
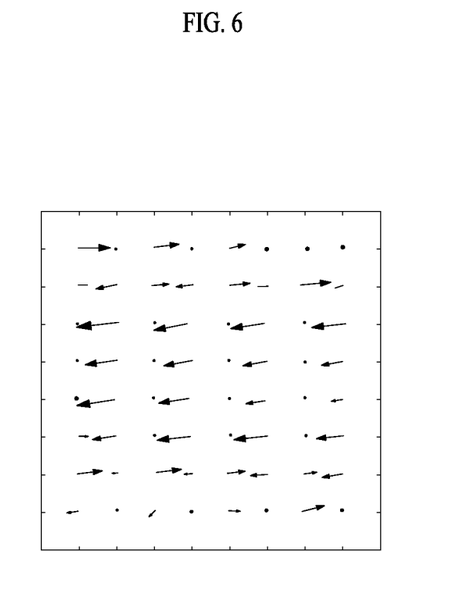
FIG. 6 is a block diagram illustrating a vector map in an embodiment of the defect detection apparatus according to the present invention.
Figure 7:
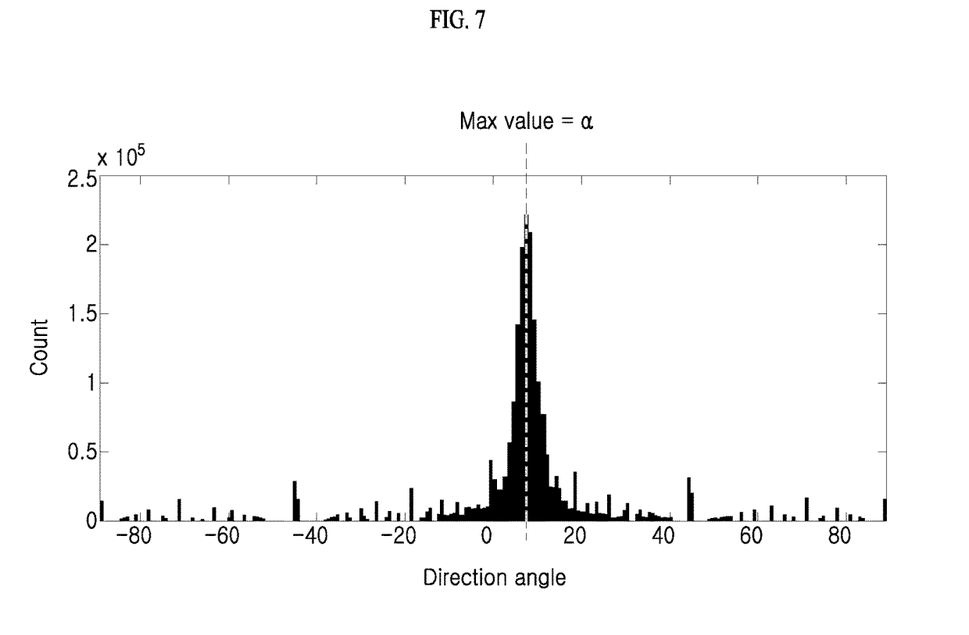
FIG. 7 is a histogram showing the number of accumulated vectors by slope angle in an embodiment of the defect detection apparatus according to the present invention.

FIG. 5 is a block diagram illustrating an angle extractor in an embodiment of the defect detection apparatus according to the present invention, FIG. 6 is a block diagram illustrating a vector map in an embodiment of the defect detection apparatus according to the present invention, and FIG. 7 is a histogram showing the number of accumulated vectors by slope angle in an embodiment of the defect detection apparatus according to the present invention.

As seen in FIG. 5, in an embodiment, the angle extractor 120 includes a vector map forming unit 121 and a histogram forming unit 123.

The vector map forming unit 121 forms a slope vector map that displays a slope angle and size vector of the pattern.

As seen in FIG. 6, in an embodiment, the vector map forming unit 121 may analyze a pattern included in the original image to extract a slope angle and a vector having a size, and form a slope vector map displaying the slope angle and vector. The vector map includes a plurality of vectors having a size and a slope angle in an area in which a corresponding vector is disposed.

The histogram forming unit 123 analyzes as the vector including the slope angle and size of the pattern as the number of accumulated vectors by slope angle to extract the analyzed histogram.

As seen in FIG. 7, in an embodiment, the histogram forming unit 123 classifies a plurality of vectors according to a slope angle by using the slope vector map formed by the vector map forming unit 121, and extracts a histogram which is obtained by analyzing the number of accumulated vectors by slope angle.

In the histogram obtained by analyzing the number of accumulated vectors by slope angle, the number of accumulated vectors by slope angle may be shown in the form of normal distributions.

A slope angle forming a periodic pattern can be found by analyzing the slope vector map. That is, the slope vector map includes the plurality of vectors having the slope angle and the size, and thus, when the slope vector map is expressed as a histogram which is obtained by counting the number of vectors having a corresponding slope angle with the slope angle as the x-axis, the most slope angles of the plurality of vectors can be found.

This denotes the most slope angles of vectors included in a periodically formed pattern in the original image, and thus, the found slope angle may be predicted as a slope angle forming a pattern of the original image.

For example, it can be seen in the histogram of FIG. 7 that there are the most accumulated vectors at about 10 degrees. This denotes that a slope angle of a pattern formed in the original image is about 10 degrees.

Referring again to FIG. 3, the pattern period extractor 130 extracts a pattern period in which the patterns are separated from each other, by using the slope angle.

The pattern period extractor 130 may form a virtual straight line in a direction parallel to or perpendicular to a slope angle, and analyze a histogram recording a brightness change in the virtual straight line to extract the pattern period in which the patterns are separated from each other.

This will be described in more detail with reference to FIGS. 8 and 9.

Figure 8:
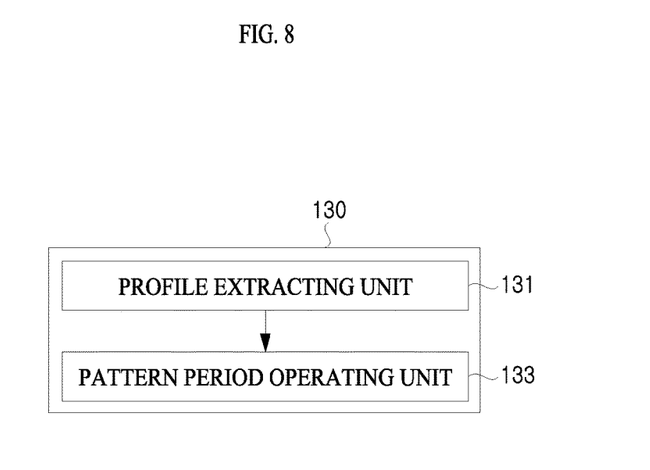
FIG. 8 is a block diagram illustrating a pattern period extractor in an embodiment of the defect detection apparatus according to the present invention.
Figure 9A:
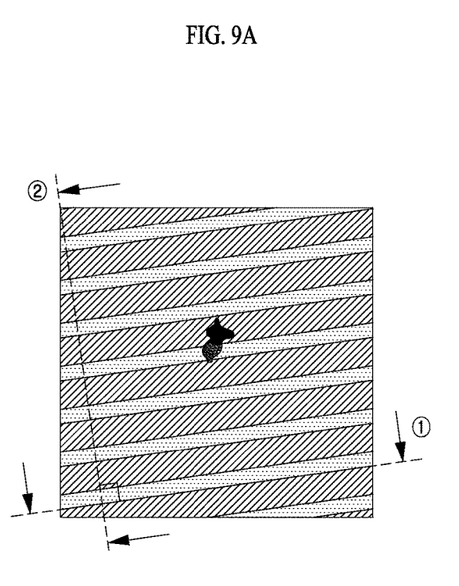
FIGS. 9A and 9B illustrate extracting a pattern period in an embodiment of the defect detection apparatus according to the present invention.
Figure 9B:
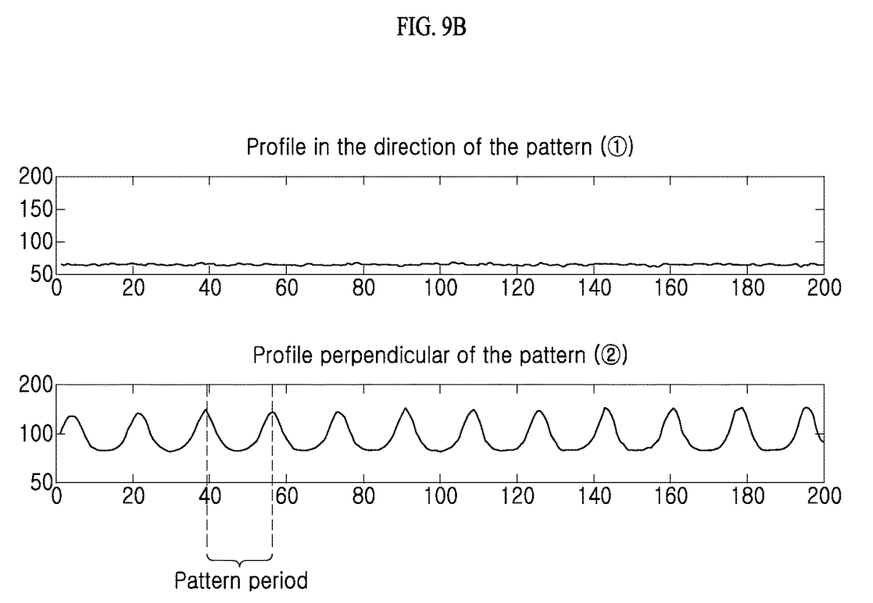

FIG. 8 is a block diagram illustrating the pattern period extractor in an embodiment of the defect detection apparatus according to the present invention, and FIG. 9B is a histogram for extracting a pattern period in an embodiment of the defect detection apparatus according to the present invention.

As seen in FIG. 8, the pattern period extractor 130 includes a profile extracting unit 131 and a pattern period operating unit 133.

The profile extracting unit 131 extracts, as a profile, a brightness change in the virtual straight line formed in a slope-angle direction (a parallel direction) and a direction perpendicular to a slope angle by using the slope angle of a pattern.

That is, in an embodiment, as seen in FIG. 9A, the profile extracting unit 131 analyzes a darkness and brightness change in a straight line passing in the slope-angle direction ① and the direction ② perpendicular to the slope angle to form a profile shown in FIG. 9B. More specifically, the profile extracting unit 131 analyzes a darkness and brightness change in a straight line formed in the slope-angle direction ① to form profile number 1 (an upper side in FIG. 9B), and analyzes a darkness and brightness change in a straight line formed in the direction ② perpendicular to the slope angle to form profile number 2 (a lower side in FIG. 9B).

In this case, as seen in FIG. 9B, it can be seen that the darkness and brightness change in the virtual straight line formed in the direction perpendicular to the slope angle is made at a period matching a period of a pattern.

The pattern period operating unit 133 calculates a period, in which a level of darkness and brightness is changed in the profile, by using the profile extracted by the profile extracting unit 131 to extract a separation period of a pattern formed in the original file.

In an embodiment, the patter period operating unit 133 calculates the pattern period by using the profiles number 1 and 2 which are formed by the darkness and brightness change in the straight line passing in the slope-angle direction and the direction perpendicular to the slope angle. That is, in the profile number 2, an interval at which patterns are separated from each other matches a period of a periodically formed pattern, and thus, the pattern period operating unit 133 may extract a period having the form of repeated profiles to calculate the period of the pattern.

Referring again to FIG. 3, the image shifter 140 shifts the original image by the pattern period in at least one of directions perpendicular and parallel to the slope angle to form the shifted image.

This will be described in more detail with reference to FIG. 10.

Figure 10:
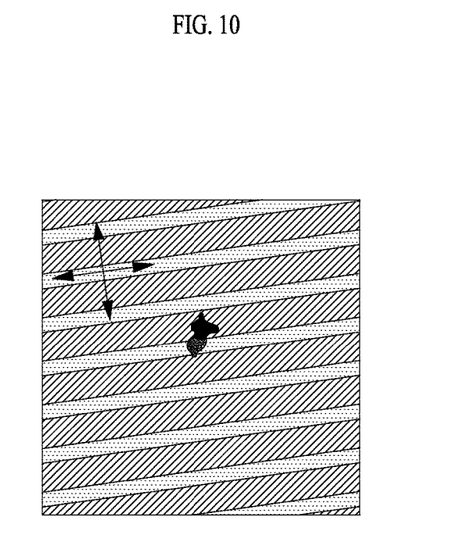
FIG. 10 is a diagram showing an image shift of an image shifter in an embodiment of the defect detection apparatus according to the present invention.

FIG. 10 is a diagram showing an image shift of the image shifter in an embodiment of the defect detection apparatus according to the present invention.

The image shifter 140 may shift an image in the slope-angle direction and the direction perpendicular to the slope angle by using the slope angle of the pattern extracted from the original image.

As seen in FIG. 10, in an embodiment, the image shifter 140 may shift an image in at least one of a negative direction parallel to the slope angle, a positive direction parallel to the slope angle, a negative direction perpendicular to the slope angle, and a positive direction perpendicular to the slope angle.

At this time, the image shifter 140 may shift the original image by a pattern period in the above-described direction to generate the shifted image, but when there is no defective pattern, by shifting the original image by the pattern period, the original image can completely match the shifted image.

Referring again to FIG. 3, the defect detector 150 removes an overlapping area from the original image and the shifted image to detect a defect.

In an embodiment, the defect detector 150 may combine a plurality of images shifted by the image shifter 140 to remove the overlapping area and extract only an non-overlapping area. The defect detector 150 may determine the extracted non-overlapping area as a defective area.

That is, since an area which is repeated as a periodic pattern maintains the periodic pattern even in the shifted image, the defect detector 150 determines the repeated area as not being a defective area, and since an aperiodically formed area is not repeated, the defect detector 150 determines the aperiodically formed area as the defective area.

This will be described in more detail with reference to FIG. 11.

Figure 11:
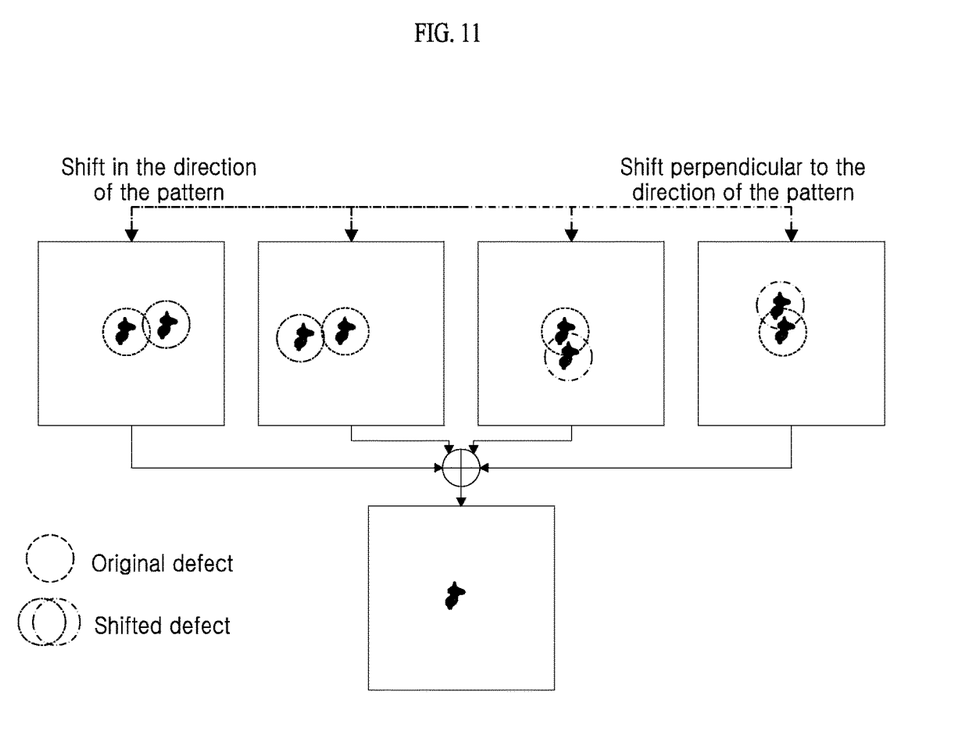
FIG. 11 is diagrams showing detected defects in a defect detector in an embodiment of the defect detection apparatus according to the present invention.

FIG. 11 illustrates detected defects in the defect detector in an embodiment of the defect detection apparatus according to the present invention.

As seen in FIG. 11, the defect detector 150 overlaps the original image with an image shifted in the negative direction parallel to the slope angle, and by removing a duplicated area from the overlapping image, the defect detector 150 extracts a defective area which has moved in the negative direction parallel to the slope angle.

Moreover, the defect detector 150 overlaps the original image with an image shifted in the positive direction parallel to the slope angle, and by removing a duplicated area from the overlapping image, the defect detector 150 extracts a defective area which has moved in the positive direction parallel to the slope angle.

Moreover, the defect detector 150 overlaps the original image with an image shifted in the negative direction perpendicular to the slope angle, and by removing a duplicated area from the overlapping image, the defect detector 150 extracts a defective area which has moved in the negative direction perpendicular to the slope angle.

Moreover, the defect detector 150 overlaps the original image with an image shifted in the positive direction perpendicular to the slope angle, and by removing a duplicated area from the overlapping image, the defect detector 150 extracts a defective area which has moved in the positive direction perpendicular to the slope angle.

In this way, by finally adding images having the defective areas which are obtained by overlapping the original image with the images shifted in the four directions, a pattern which is formed by being repeated at certain periods is removed from the original image, and only a defective area remains.

However, as described above, the defect detection apparatus 100 according to the present invention needs not to shift an image in all of the four directions for finding a defective area from the original image, and in another embodiment, the defect detector 150 may remove an overlapping area by adding the original image and at least one of the images shifted in the negative direction parallel to the slope angle, the positive direction parallel to the slope angle, the negative direction perpendicular to the slope angle, and the positive direction perpendicular to the slope angle, and extract a defect of the original image.

The defect classifier 160 stores a plurality of predetermined defective types, and classifies a defective type of a target determined as a detective area by the defect detector 150. To this end, the defect classifier 160 may store defective data including a kind, size, type, etc. of a defect.

<Defect Detection Method>

Figure 12:
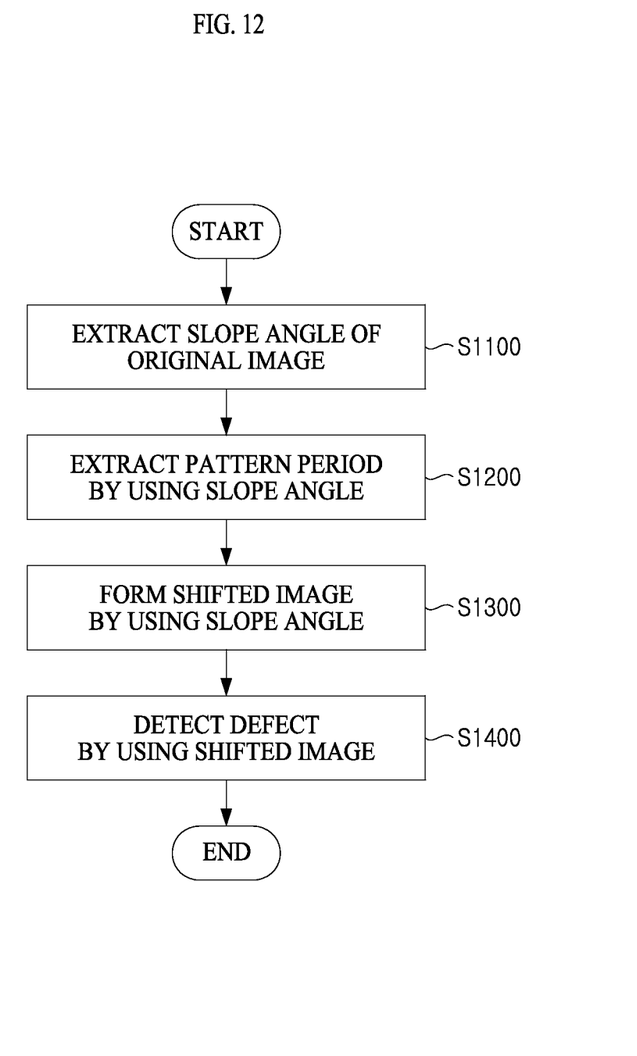
FIG. 12 is a flowchart illustrating an embodiment of a defect detection method according to the present invention.

FIG. 12 is a flowchart illustrating an embodiment of a defect detection method according to the present invention.

As seen in FIG. 12, the defect detection method according to the present invention first extracts a slope angle of a pattern from the original image in which patterns are formed at periodic intervals in operation S1100.

The original image may be obtained by using an image capturing device or an previously captured image, and may include a defective area, which is formed in an aperiodic and irregular type, as well as patterns which are formed at periodic intervals.

In an embodiment, the angle extracting operation may extract a vector including a slope angle and size of the pattern to analyze the number of accumulated vectors by slope angle, and determine, as a slope angle of the pattern, a slope angle having the maximum number of accumulated vectors.

To this end, the angle extracting operation may analyze the original image to form a slope vector map displaying a slope and size vector of a pattern. The slope vector map is to display a size and slope angle of a corresponding vector among a plurality of extracted vectors composing the pattern.

The plurality of vectors included in the slope vector map includes slope angle information of the pattern, and thus, the number of accumulated vectors by slope angle of the pattern may be extracted by using a histogram.

That is, the slope vector map includes the plurality of vectors having a slope angle and a size, and by expressing the slope vector map as the histogram with the slope angle as the x-axis, a slope angle having the most vectors can be found.

In the histogram, a slope having the most accumulated vectors denotes the most directions among directions of a plurality of vectors included in the original image, and thus may be predicted as a slope angle of a pattern.

Subsequently, the defect detection method extracts a pattern period at which the patterns are separated from each other, by using the slope angle in operation S1200.

In an embodiment, the pattern period extracting operation may analyze a darkness and brightness change in one of a plurality of straight lines passing in the slope-angle direction and the direction perpendicular to the slope angle to extract the pattern period.

For example, the pattern period extracting operation forms a virtual straight line in a direction perpendicular to patterns which are formed to be separated from each other at certain periods, and by extracting a brightness change along the virtual straight line, the brightness change is periodically made according to a period at which the patterns are repeated.

Therefore, the pattern period extracting operation may extract a slope angle of a pattern to form a virtual straight line in a direction parallel or perpendicular to the slope angle, and by analyzing a darkness and brightness change in a corresponding straight line, the pattern period extracting operation may extract a pattern period of a periodic pattern formed in the original image.

Subsequently, the defect detection method shifts the original image by the pattern period to form the shifted image in operation S1300.

Since the slope angle and the pattern period are extracted, the original image is shifted by using the slope angle and the pattern period. That is, the original image is shifted in the direction parallel and perpendicular to the slope angle. Here, the original image may be shifted by the pattern period. When the original image may be shifted by the pattern period to form the shifted image, it can be seen that patterns except a defective area match each other.

In an embodiment, the image shift may be performed in at least one of a negative direction parallel to the slope angle, a positive direction parallel to the slope angle, a negative direction perpendicular to the slope angle, and a positive direction perpendicular to the slope angle.

Moreover, the image shift may be made by shifting the original image by the pattern period in the direction. Since a pattern is formed to be repeated at a certain period in the original image, by shifting the original image by the pattern period in the direction perpendicular or parallel to the slope angle of the pattern, the original image mostly overlaps the shifted image.

Subsequently, the defect detection method removes an overlapping area between the original image and the shifted image to detect a defect in operation S1400.

The original image, as described above, mostly overlaps the shifted image. However, when a defect is formed in a certain area, a defective position of the original image differs from that of the shifted image, and thus, a position of a defect of the original image differs from that of a defect of the shifted image. As a result, when an overlapping area is removed by overlapping the original image with the shifted image, only a non-overlapping defect remains in a combined image.

In an embodiment, the defect detection method overlaps the original image with an image shifted in the negative direction parallel to the slope angle, and by removing a duplicated area from the overlapping image, the defect detection method extracts a defective area which has moved in the negative direction parallel to the slope angle.

Moreover, the defect detection method overlaps the original image with an image shifted in the positive direction parallel to the slope angle, and by removing a duplicated area from the overlapping image, the defect detection method extracts a defective area which has moved in the positive direction parallel to the slope angle.

Moreover, the defect detection method overlaps the original image with an image shifted in the negative direction perpendicular to the slope angle, and by removing a duplicated area from the overlapping image, the defect detection method extracts a defective area which has moved in the negative direction perpendicular to the slope angle.

Moreover, the defect detection method overlaps the original image with an image shifted in the positive direction perpendicular to the slope angle, and by removing a duplicated area from the overlapping image, the defect detection method extracts a defective area which has moved in the positive direction perpendicular to the slope angle.

In this way, by finally adding images (four images) having the defective areas which are obtained by overlapping the original image with the images shifted in the four directions, a pattern which is formed by being repeated at certain periods is removed from the original image, and only a defective area remains.

However, as described above, the defect detection method according to the present invention needs not to shift an image in all of the four directions for finding a defective area from the original image, and in another embodiment, the defect detection method may remove an overlapping area by overlapping the original image with at least one of the images shifted in the negative direction parallel to the slope angle, the positive direction parallel to the slope angle, the negative direction perpendicular to the slope angle, and the positive direction perpendicular to the slope angle, and extract a defect of the original image.

As described above, the present invention can quickly extract a slope angle of a periodic pattern.

Moreover, the present invention can easily extract a pattern period by using the slope angle of the periodic pattern.

Moreover, the present invention shifts an image by using the slope angle and pattern period of the periodic pattern, thus easily extracting a defect of the original image.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A defect detection method comprising:
    extracting a slope angle of a pattern, which is not zero, from an original image in which a plurality of the patterns are formed at periodic intervals;
    extracting a pattern period at which the patterns are separated from each other, by using the slope angle;
    shifting the original image by the pattern period in a direction perpendicular to the non-zero slope angle to form a shifted image;
    combining the original image and the shifted image; and
    detecting an aperiodic defect by removing an overlapping area from the original image and the shifted image that are combined, wherein a remaining non-overlapping area is detected as the aperiodic defect;
    classifying a type of the aperiodic defect based on a plurality of pre-stored defective types, and
    wherein the extracting of a pattern period comprises:
    analyzing a darkness and brightness change in a straight line passing in a direction of the non-zero slope angle to generate a first profile;
    analyzing a darkness and brightness change in a straight line passing in the direction perpendicular to the non-zero slope angle to generate a second profile; and
    calculating the pattern period by using the first and second profiles, and
    wherein in the second profile, an interval at which patterns are separated from each other matches a period of a periodically formed pattern.

2. The defect detection method of claim 1, further comprising shifting the original image by the pattern period in a direction parallel to the not-zero slope angle to form a second shifted image,
    wherein the overlapping area is from the original image, the shifted image and the second shifted image.

3. The defect detection method of claim 1, wherein the extracting of a slope angle comprises extracting a vector comprising the slope angle and a size of the pattern to analyze number of accumulated vectors by slope angle, and determining a slope, having most accumulated vectors, as the slope angle of the pattern.

4. The defect detection method of claim 1, wherein the extracting of a slope angle comprises extracting a histogram which is obtained by analyzing a vector comprising the slope angle and a size of the pattern as number of accumulated vectors by slope angle to extract the slope angle having most accumulated vectors as the slope angle of the pattern.

5. The defect detection method of claim 1, wherein the shifting of the original image by the pattern period in a direction perpendicular to the non-zero slope angle comprises:
    shifting the original image by the pattern period in a negative direction perpendicular to the non-zero slope angle to form a first shifted image; and
    shifting the original image by the pattern period in a positive direction perpendicular to the non-zero slope angle to form a second shifted image,
    wherein the defect detection method further comprises:
    shifting the original image by the pattern period in a negative direction parallel to the non-zero slope angle to form a third shifted image; and
    shifting the original image by the pattern period in a positive direction parallel to the non-zero slope angle to form a fourth shifted image, and
    wherein the combining combines the original image and each of the first to fourth shifted images, and
    the detecting of an aperiodic defect comprises:
    removing a duplicate area from an overlapping image in which the original image overlaps with the first shifted image to extract a first defective area,
    removing a duplicate area from an overlapping image in which the original image overlaps with the second shifted image to extract a second defective area,
    removing a duplicate area from an overlapping image in which the original image overlaps with the third shifted image to extract a third defective area,
    removing a duplicate area from an overlapping image in which the original image overlaps with the fourth shifted image to extract a fourth defective area, and
    adding images having the first to fourth defective areas which are obtained by overlapping the original image with the first to fourth shifted images to detect the aperiodic defect.

* * * * *